(12) United States Patent
Perry

(10) Patent No.: US 6,321,294 B1
(45) Date of Patent: Nov. 20, 2001

(54) METHOD AND APPARATUS FOR CONVERTING BETWEEN LOGICAL AND PHYSICAL MEMORY SPACE IN A RAID SYSTEM

(75) Inventor: David D. Perry, Santa Cruz, CA (US)

(73) Assignee: MTI Technology Corporation, Anaheim, CA (US)

( * ) Notice: Subject to any disclaimer, the term of this patent is extended or adjusted under 35 U.S.C. 154(b) by 0 days.

(21) Appl. No.: 09/428,157

(22) Filed: Oct. 27, 1999

(51) Int. Cl.[7] .............................. G06F 12/00; G06F 11/20
(52) U.S. Cl. .......................... 711/114; 711/100; 711/111; 711/112; 711/154
(58) Field of Search .................................... 711/100, 111, 711/112, 114, 154

(56) References Cited

U.S. PATENT DOCUMENTS

| | | | |
|---|---|---|---|
| 5,613,085 | * 3/1997 | Lee et al. | 711/114 |
| 5,758,118 | * 5/1998 | Choy et al. | 711/114 |
| 5,948,110 | * 9/1999 | Hitz et al. | 711/6 |
| 5,974,515 | * 10/1999 | Bachmat et al. | 711/170 |
| 6,151,641 | * 11/2000 | Herbert | 710/22 |

* cited by examiner

Primary Examiner—Tuan V. Thai
(74) Attorney, Agent, or Firm—Townsend and Townsend and Crew LLP

(57) ABSTRACT

A method for converting between logical and physical memory space which adapts to different RAID types and configurations in a modular form. In particular, a module containing a standard set of conversion algorithms is used for all conversions. The standard set of conversion or translation algorithms operate on a pseudo representation of a RAID array that has all redundant components removed. For each RAID type and configuration, the standard algorithms can be used unchanged if a method is provided to convert the real RAID array representation into the pseudo version and back again. This simplifies both the programming and the debugging. This also makes the software more modular and more easily upgradeable.

8 Claims, 4 Drawing Sheets

METHOD AND APPARATUS FOR CONVERTING BETWEEN LOGICAL AND PHYSICAL MEMORY SPACE IN A RAID SYSTEM

BACKGROUND OF THE INVENTION

The present invention relates to Redundant Array of Independent Disks (RAID) systems, and in particular to methods for efficiently allocating memory space in RAID systems allowing different configurations.

RAID systems allow the storing of memory data across multiple disks. A number of different levels of RAID are available, ranging from mirroring of disks to more complicated striping configurations across larger groups of disks with error correction and redundancy data. The number of disks in a redundancy group can vary from two to three to four to five to any other number. In some environments, such as network environments, multiple users may be using the same physical disk drives, but may use different levels of RAID for storing their particular data.

Accordingly, one of the challenges in the RAID system is to efficiently and consistently translate between logical memory space and physical memory space on the disk drives or other memory device in accordance with the different RAID parameters of different blocks of data. Two types of transformations are generally needed. First, a logical to physical transformation needs to transform the data requests from the logical address space to physical accesses on individual members, disk drives, or memory devices in the RAID redundancy group. Second, a conversion from a physical address on a device in the redundancy group to a logical address on the array is required during certain types of operations.

The conversion or translation calculations are different for each RAID type and configuration. For example, a 2-wide RAID array using mirror redundancy uses one set of conversion algorithms while another array configured for 9 drives and parity type redundancy uses a completely different type of conversion and thus a different set of algorithms must be generated. The type of redundancy used (sometimes called the "RAID level"), the width of the array, the striping factor, and other elements of the array's configuration all require modifications to the algorithms of translation. Obviously, this makes the programming more complex and subject to error.

SUMMARY OF THE INVENTION

The present invention provides a method for converting between logical and physical memory space which adapts to different RAID types and configurations in a modular form. In particular, a module containing a standard set of conversion algorithms is used for all conversions. The standard set of conversion or translation algorithms operate on a pseudo representation of a RAID array that has all redundant components removed. For each RAID type and configuration, the standard algorithms can be used unchanged if a method is provided to convert the real RAID array representation into the pseudo version and back again. This simplifies both the programming and the debugging. This also makes the software more modular and more easily upgradeable.

In one embodiment, the primary transformation creates a pseudo stripe from a number of real stripes which differs from the redundancy groupings. Preferably, this is done by selecting a number of real stripes which will end on the boundary of a redundancy grouping.

In one embodiment, conversion uses a value calculated by dividing the redundancy group width by the greatest common factor of the redundancy group width and the physical array width. The whole number portion of the result then provides the number of real physical stripes in a single pseudo stripe. This value is essential to conversion between the real and pseudo representation of this type of array and back again. During translation from logical to physical address spaces as described above, the real array representation is converted with the help of this value to the pseudo representation at which time the, standard translation algorithms can be applied. Subsequently, the output of the standard algorithms using the pseudo representation is converted using this value to values that apply to the real array representation which can then be used for access to the actual devices of the array.

In one embodiment, upon creation of the array, the pseudo to real conversion factor is determined and stored so that it need not be recalculated for each operation.

For a further understanding of the nature and advantages of the invention, reference should be made to the following description taken in conjunction with the accompanying drawings.

DESCRIPTION OF THE SPECIFIC EMBODIMENTS

Figure 1:
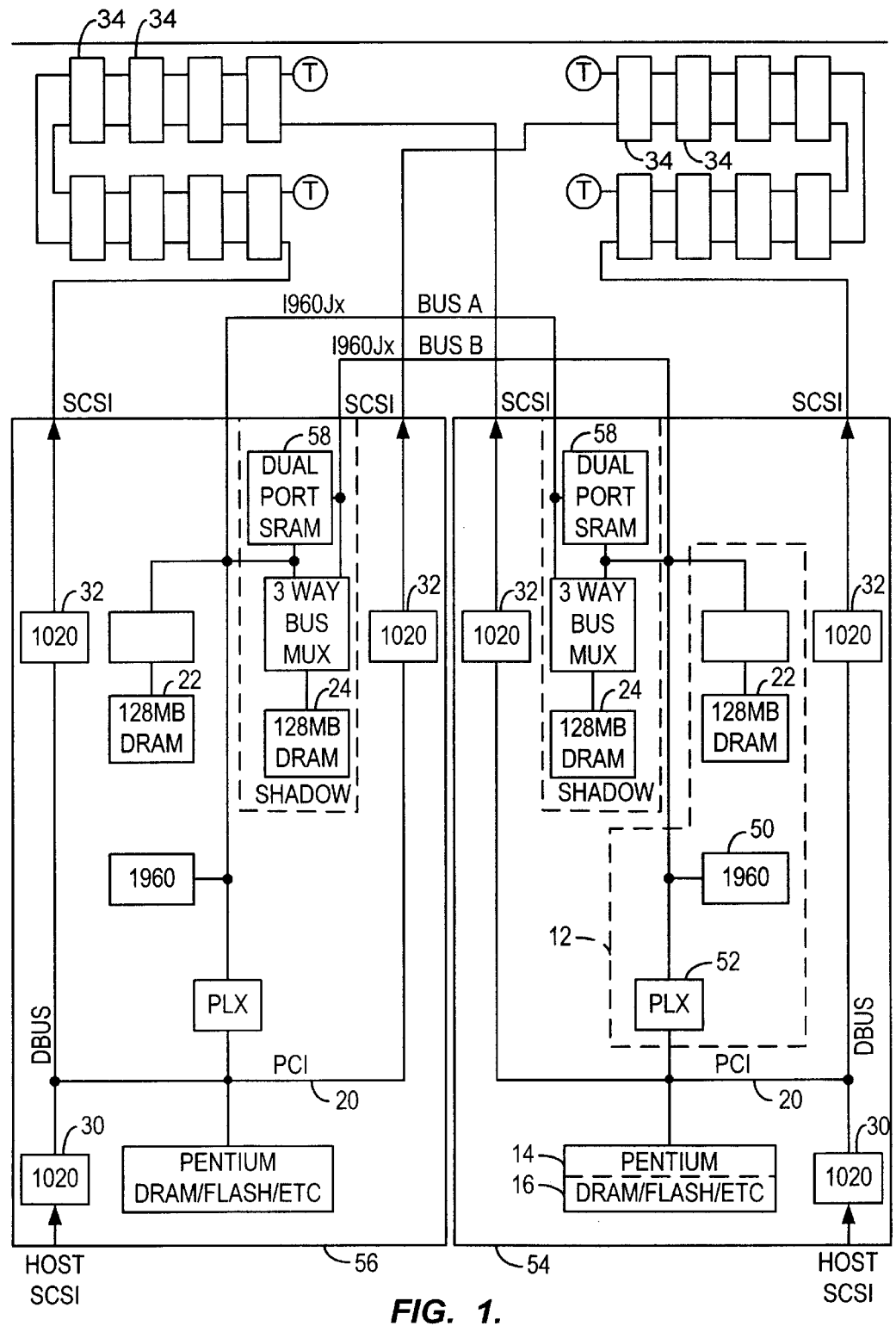
FIG. 1 is a diagram of a pair of RAID controllers and a group of disk drives used in the invention.

FIG. 1 is a block diagram of a RAID system according to the invention.

As can be seen, data flow is provided through two different host SCSI interfaces 30 to the disk drives 34. Each host SCSI interface 30 communicates with two RAID SCSI interfaces 32 over PCI busses 20. Data is staged in-between them in a buffer memory 22. Shadow buffer memories 24 are provided for redundancy.

A RAID engine controller 50 is used for generating RAID functions. Microprocessor 14 performs the transformations of the present invention, and then the particular operation codes are transmitted across PCI bus 20 through PLX interface 52 to controller 50.

The conversion of one embodiment of the invention converts real physical striping information into Pseudo Stripes. Pseudo Stripes are artificial stripes that represent the RAID array's fundamental data formatting with all redundancy information removed. These stripes are used as input to the standard striping translation calculators to determine the physical location in the Pseudo array representation of a particular logical address. Once this is determined, this information is converted to values on the Real Stripes of the array and is used to access the real physical data in the array. This is done to generalize the translation for all types of configurations.

Figure 2A:
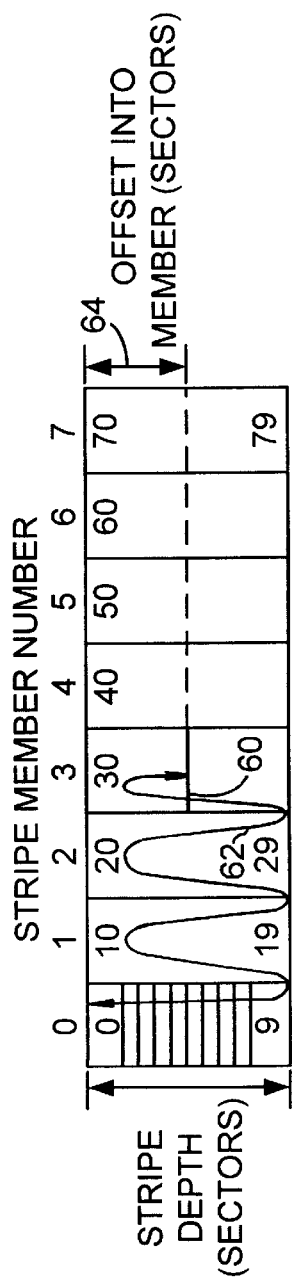
FIG. 2 (2A and 2B) is a diagram illustrating different parameters used to describe a RAID system used by the standard algorithms of the invention.
Figure 2B:
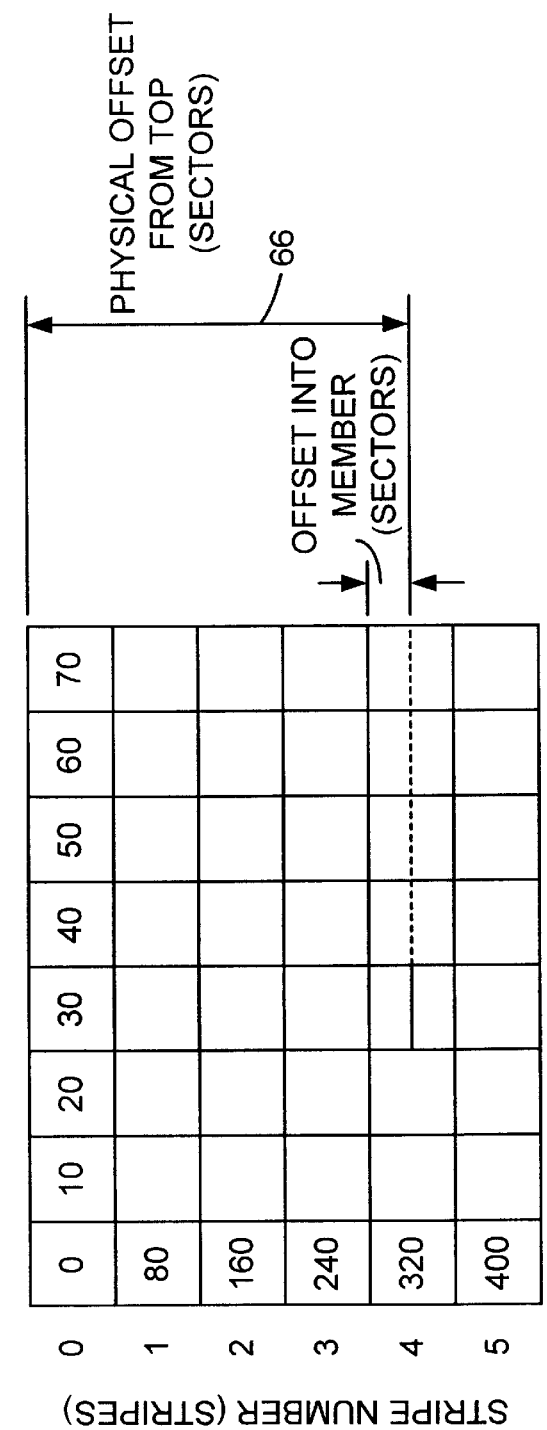

FIG. 2 illustrates some of the standard terminology used with respect to RAID stripes, and also used in the standard algorithms of the invention. FIG. 2A illustrates a stripe width of 8, having storage devices or disk drives 0–7. The stripe depth is a number of sectors on a particular disk drive for a particular stripe. The offset into the stripe is the number of sectors to a particular position, such as a position 60 illustrated in FIG. 2A, with the offset being the number of sectors traversed by arrow 62. An offset into a particular member or disk drive (in sectors) is indicated by example of arrow 64. This is also shown in FIG. 2B, with a separate physical offset from the top or first stripe being illustrated by arrow 66.

The methods for translating addresses on this simple striped configuration are well known and referred to here as the standard striping algorithms. These standard algorithms assume that all members of the stripe contain unique data and that there is no redundancy information in the stripe. With this assumption, the definitions shown in FIG. 2 make sense. However, if this is varied, these definitions no longer make sense.

Figure 3:
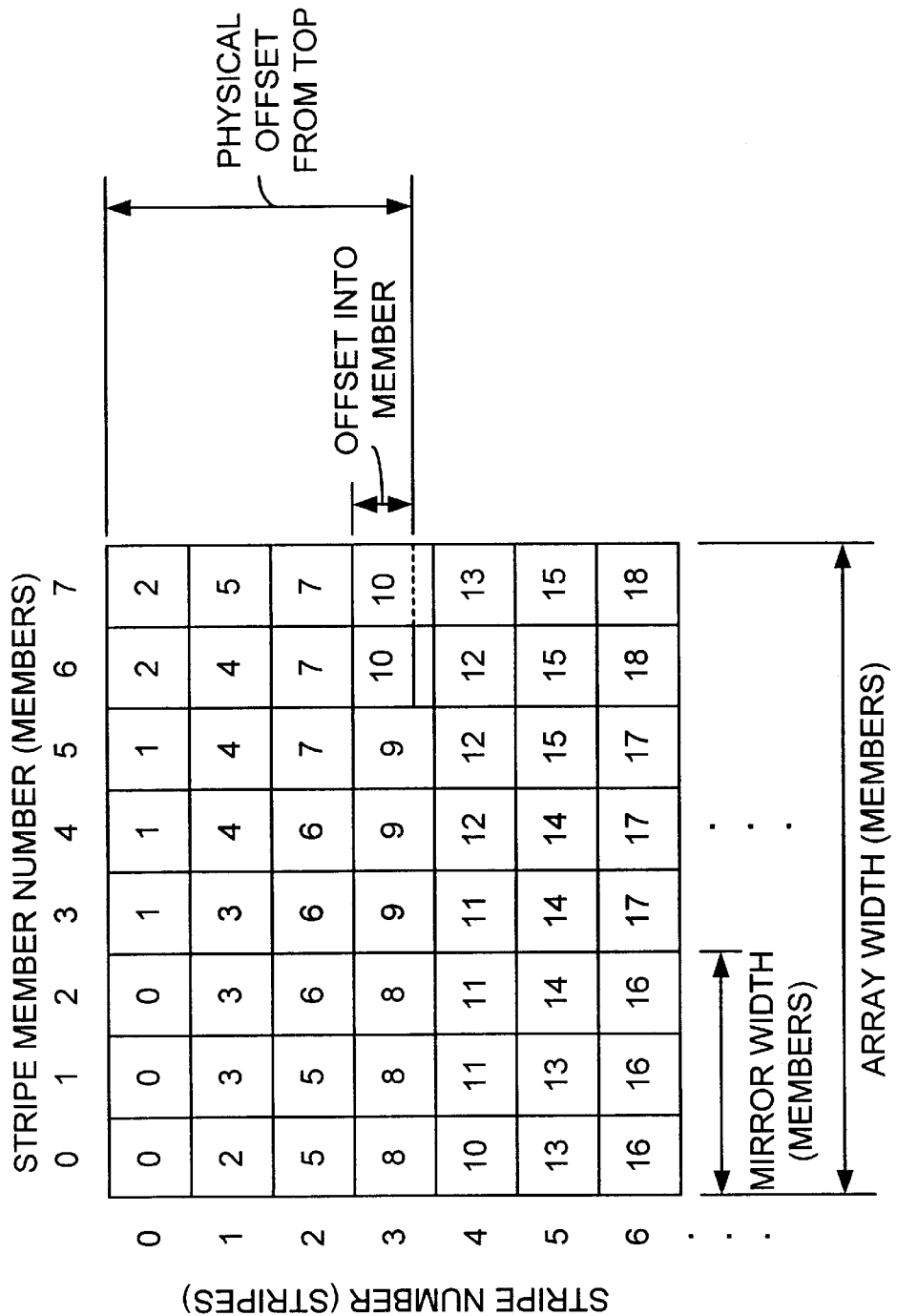
FIG. 3 is a diagram illustrating the application of logical redundancy groups to the physical RAID array according to one embodiment of the invention.

In the embodiment shown in FIG. 3, each Stripe data chunk is copied (mirrored) two times to make a redundancy group or mirror width of 3. This example shows the complication involved in translating logical addresses for configurations in which a redundancy group is split across the Real Stripes of the array. No assumptions can be used in determining the location of the next data block for this configuration. A non-generalized algorithm might, for example, have to determine a "split-factor" for every access on the array and this value would change for each new type of configuration (mirror width, stripe depth, etc.).

A typical solution to this problem is to develop a new algorithm for each new type of configuration (e.g., each mirror width required a new translation algorithm). The present invention allows all types of striping with mirroring configurations to be used without modification to the translation algorithm. All mirror width, array width, and stripe depth combinations are inherently supported.

Figure 4:
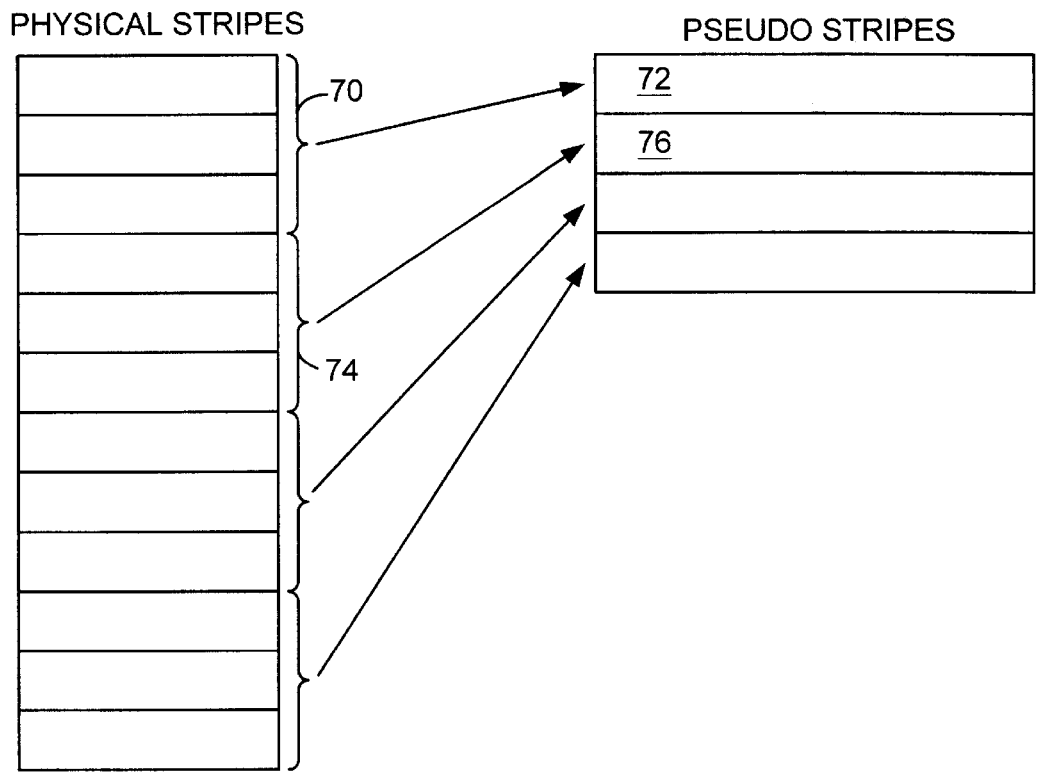
FIG. 4 is a diagram illustrating the creation of pseudo stripes according to an embodiment of the invention.

The method used in the present invention converts the real stripes of the array into an intermediate pseudo stripe as illustrated in FIG. 4. The pseudo stripes are in a form that can be processed by the standard striping calculators in order to determine the location of the access on the array. Subsequently, the pseudo stripe is converted back into the Real representation from which the access to physical devices can be determined. As shown in FIG. 4, if it takes three physical stripes before a redundancy group ends on a physical stripe boundary, then three physical stripes are mapped into a single pseudo stripe. As shown, the first three physical stripes 70 are mapped into a first pseudo stripe 72 which consists of all data chunks from the stripe without any redundancy (all mirrored/copied information removed). Similarly, the next three physical stripes 74 are mapped into a second pseudo stripe 76, and so on.

In order to generate a description of a Pseudo Stripe, we find the number of REAL stripes that it takes until we end on an even Redundancy Group boundary. This number is "RealStripesPerStripe". For instance, if the width of each mirror is 2 (# copies =2) and the REAL width of the array is 5, the RealStripesPerStripe is 2. This means that every second stripe ends on an even Mirror member boundary. Alternatively, if the # Copies is 3 and the width is 7, then the RealStripesPerStripe is 3.

Conceptually, then the width of the new Pseudo array is Width*RealStripesPerStripe. RealStripesPerStripe is used to scale all REAL values to PSEUDO values as needed.

Figure 5:
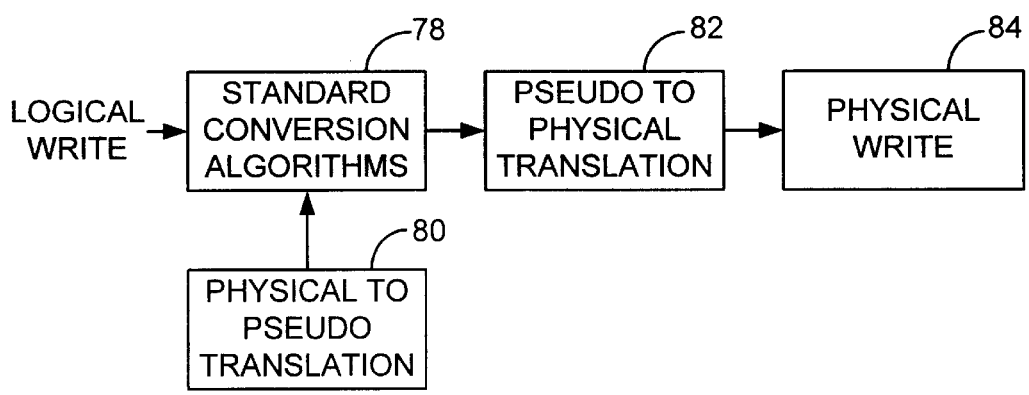
FIG. 5 is a diagram illustrating a conversion from logical to physical using the pseudo representation of the invention.

FIG. 5 illustrates the different software modules used to accomplish the transformations of the invention for the example of a logical write. A first module 78 contains the standard conversion algorithms which assume that the logical and physical stripe widths are identical. This module is provided with the physical to pseudo translation 80, so that it operates on the pseudo stripes. After the operations are done, a pseudo to physical translation is done in a block 82, and then the actual physical write is done using a software module 84. Thus, the same block 78 can be used for any RAID configuration, with only the blocks 80 and 82 needing to be customized for any particular RAID configuration.

The determination of the number of physical stripes in a single pseudo stripe is accomplished by using the formula $MOD(R/GCF[R,W])$. In the example of FIG. 3, the redundancy group, R, is 3, and the physical stripe width, W, is 8. Plugging in the numbers for the above example, W=8 and R=3. This gives $MOD(3/GCF[3,8])$. GCF means the greatest common factor, which is the greatest number which can divide evenly into both numbers. The greatest common factor of 8 and 3 is 1, since no larger number is divisible into both 3 and 8. This gives a result of 3 for the formula.

The following description gives more details of the actual translations done. First, the input and output calculators for a standard conversion are shown.

1. Logical→Physical Conversion
    Input:
        a. Stripe Depth
        b. Stripe Width
        c. Logical Block Number
    Output:
        a. Stripe Size
        b. Stripe Number
        c. Stripe Member Number
        d. Offset into Stripe
        e. Offset into Member
        f. Physical Offset from top
2. Physical→Logical Conversion
    Input:
        a. Stripe Depth
        b. Stripe Width
        c. Stripe Number
        d. Stripe Member Number
3. Physical Offset from top
    Output:
        a. Logical Block Number The above standard calculations can be used for simple striped RAID configurations as shown in FIG. 2 (2A and 2B) with a conversion as set forth below for the pseudo representation of the invention.

Fixed Inputs:
a. Array Width
    Number of physical devices making up the array
b. Stripe Depth (or Chunk Size)
    The "striping factor" of the array
c. Number of Mirror copies per Stripe Member (copies) (Redundancy Group Size)
d. Real Stripes per Pseudo Stripe (RSPS) calculated from above values: (c)/GCF((a), (c))

1. Real to Pseudo Translation
    Inputs:
        a. Stripe Member Number
        b. Physical Offset from top Outputs:
 a. Offset into member (OIM)
 b. Stripe Number (S#)
 c. Stripe Width (SW)
 d. Stripe Member Number (SM#)
 e. Physical Offset from top (POFT)
2. Pseudo to Real Translation
 Inputs:
  a. Stripe member Number
  b. Physical Offset from top
 Outputs:
  a. Offset into Member
  b. Stripe Member Number
  c. Physical Offset from top
  d. Stripe Number
  e. Offset into Stripe The object of the conversion routines is to transition from the real world representation of FIG. 3 to the artificial representation that embodies FIG. 2 in order to apply the striping calculators. The conversion routines then allow the transition back to the real world with the stripe access information intact.

Conversion Algorithms
Definitions:
SD Stripe Depth
SW Stripe Width
OIM Offset into Member
S# Stripe Number
SM# Stripe Member Number
POFT Physical Offset from top
OIS Offset into Stripe
MW Mirror Width
SIS Stripe in Stripe
RSPS Real Stripes per Stripe
Pseudo Value=Real Value Equation
 a. $OIM_p$=POFT % SD
 b. $S\#_p$=POFT/(RSPS*SD)
 c. $SW_p$=(POFT %(RSPS*SD))/SD
 d. $SM\#_p$=(SM#=(SIS*SW))/MW
 e. $POFT_p$=S#P*SD t $OIM_p$ Note: All values indicated with a "p" subscript are pseudo. SD is the same in both representations. SIS is always a real-world value
Real=Pseudo $$SIS_R=(SM\#*MW)/SW$$

a. $OIM_R$=POFT % SD
 b. $SM\#_R$=(SM#*MW)% SW
 c. $POFT_R$=(POFT/SD)*SD*RSPS+$SIS_R$*SD+$O1M_R$
 d. $POFT_R$=$POFT_R$/SD
 e. $O1S_R$=$SM\#_R$*SD+$OIM_R$

Notes: All values with an R subscript are Real Value. All values on right side are Pseudo except where noted. SW is the Real value for entire process SD is the same in Real or Pseudo versions. SIS is always Real As will be understood by those of skill in the art, the present invention may be embodied in other specific forms without departing from the essential characteristics thereof. Accordingly, the foregoing description is intended to be illustrative, but not limiting, of the scope of the invention which is set forth in the following claims.

What is claimed is:

1. A method for converting between logical and physical memory space in a RAID system, comprising:

converting a real representation of physical memory in said RAID system for a particular selected RAID configuration into a pseudo representation corresponding to said selected RAID configuration; and converting to and from said logical memory space using said pseudo representation and a standard set of conversion algorithm which are unchanged for any particular selected RAID configuration;

storing said pseudo representation as an initialized pseudo representation upon initialization of said particular selected RAID configuration; and providing said initialized pseudo representation to said standard set of conversion algorithms upon each addressing of said RAID system with a logical address, whereby a logical address is transformed into a pseudo address; and transforming a result of a standard conversion algorithm from a pseudo representation into a physical representation.

2. The method of claim 1 further comprising:

providing a physical array of RAID storage devices having a stripe width of W devices;

selecting a logical redundancy group stripe width of R memory storage devices for said particular selected RAID configuration; and providing in said pseudo representation pseudo stripes of memory storage devices consisting of X physical stripes which end on a boundary of one of said R logical redundancy groups.

3. The method of claim 2 further comprising:

determining X by dividing R by the greatest common factor of R and W, and setting X equal to the modulo of the result.

4. The method of claim 1 wherein said pseudo representation comprises stripes with all redundancy information removed.

5. A method for converting between logical and physical memory space in a RAID system, comprising:

converting a real representation of physical memory in said RAID system for a particular selected RAID configuration into a pseudo representation corresponding to said selected RAID configuration;

converting to and from said logical memory space using said pseudo representation and a standard set of conversion algorithms which are unchanged for any particular selected RAID configuration;

providing a physical array of RAID storage devices having a stripe width of W devices;

selecting a logical redundancy group stripe width of R memory storage devices for said particular selected RAID configuration;

providing in said pseudo representation pseudo stripes of memory storage devices consisting of X physical stripes which end on a boundary of one of said R logical redundancy groups; and determining X by dividing R by the greatest common factor of R and W, and setting X equal to the modulo of the result.

6. An apparatus for converting between logical and physical memory space in a RAID system, comprising:

means for converting a real representation of physical memory in said RAID system for a particular selected RAID configuration into a pseudo representation corresponding to said selected RAID configuration; and means for converting to and from said logical memory space using said pseudo representation and a standard set of conversion algorithms which are unchanged for any particular selected RAID configuration;

means for providing a physical array of RAID storage devices having a stripe width of W devices;

means for selecting a logical redundancy group stripe width of R memory storage devices for said particular selected RAID configuration;

means for providing in said pseudo representation pseudo stripes of memory storage devices consisting of X physical stripes which end of a boundary of one of said RAID logical redundancy groups;

means for determining X by dividing R by the greatest common factor of R and W, and setting X equal to the modulo of the result.

7. The apparatus of claim 6 further comprising:

means for storing said pseudo representation as an initialized pseudo representation upon initialization of said particular selected RAID configuration; and means for providing said initialized pseudo representation to said standard set of conversion algorithms upon each addressing of said RAID system with a logical address, whereby a logical address is transformed into a pseudo address; and means for transforming a result of a standard conversion algorithm from a pseudo representation into a physical representation.

8. A RAID system comprising:

a physical array of RAID storage devices having a stripe width of W devices;

a control processor for said RAID system;

a program memory coupled to said control processor, said program memory comprising memory media having computer readable instructions imbedded therein for converting a real representation of physical memory in said RAID system for a particular selected RAID configuration into a pseudo representation corresponding to said selected RAID configuration;

converting to and from said logical memory space using said pseudo representation and a standard set of conversion algorithms which are unchanged for any particular selected RAID configuration;

selecting a logical redundancy group stripe width of R memory storage devices for said particular selected RAID configuration;

providing in said pseudo representation pseudo stripes of memory storage devices consisting of X physical stripes which end on a boundary of one of said R logical redundancy groups; and determining X by dividing R by the greatest common factor of R and W, and setting X equal to the modulo of the result.

* * * * *

UNITED STATES PATENT AND TRADEMARK OFFICE
CERTIFICATE OF CORRECTION

PATENT NO.    : 6,321,294 B1                                             Page 1 of 1
DATED         : November 20, 2001
INVENTOR(S)   : David D. Perry It is certified that error appears in the above-identified patent and that said Letters Patent is hereby corrected as shown below:

Column 6,
Line 7, change "algorithm" to -- algorithms --.

Column 7,
Line 13, change "RAID" to -- R --.

Signed and Sealed this

Twenty-fifth Day of June, 2002

Attest:

Attesting Officer

JAMES E. ROGAN
Director of the United States Patent and Trademark Office